Figure 1:
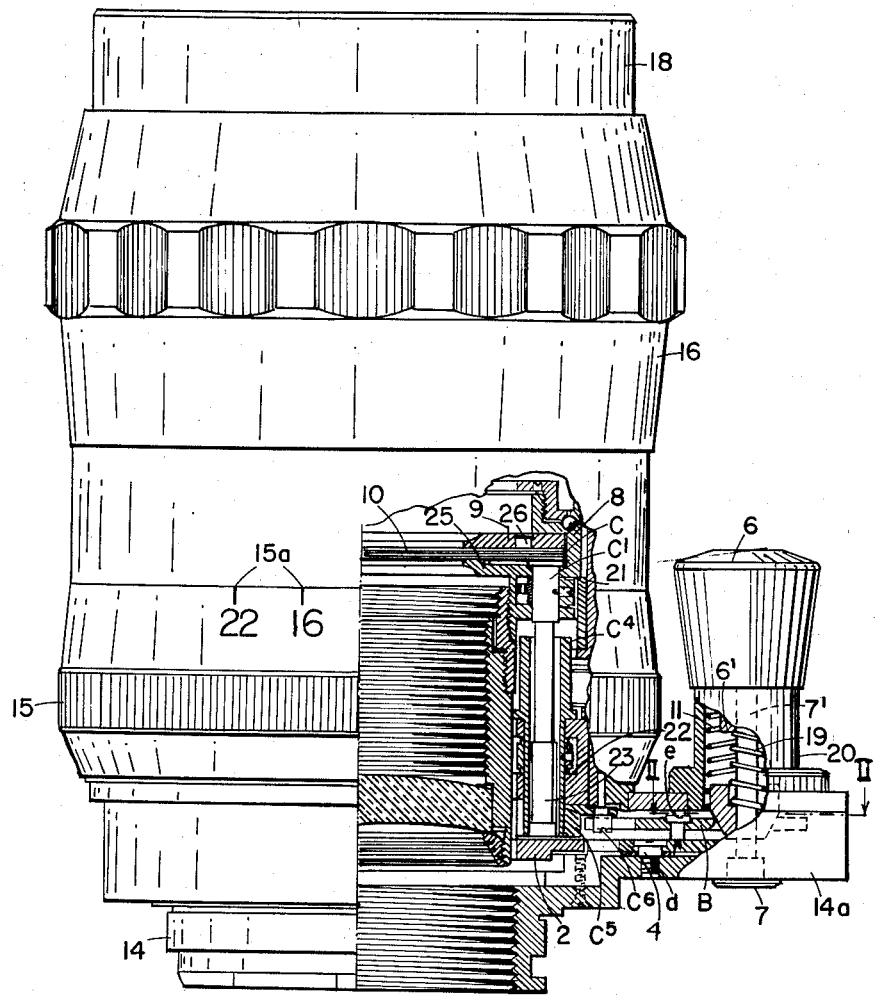

Dec. 27, 1960 K. H. SCHÜTZ 2,966,105
DIAPHRAGM-PRESELECTOR MOUNTING FOR OPTICAL SYSTEMS
Filed May 22, 1956

Karl Heinz Schütz
*INVENTOR.*

United States Patent Office 2,966,105
Patented Dec. 27, 1960

2,966,105

DIAPHRAGM-PRESELECTOR MOUNTING FOR OPTICAL SYSTEMS

Karl Heinz Schütz, Kreuznach, Rhineland, Germany, assignor to Jos. Schneider & Co., Optische Werke, Kreuznach, Rhineland, Germany, a German firm Filed May 22, 1956, Ser. No. 586,559

Claims priority, application Germany May 28, 1955

2 Claims. (Cl. 95—64)

My present invention relates to a diaphragm preselector for an optical system, such as the objective of a photographic camera, adapted to move an iris-type diaphragm from a wide-open position of adjustment, used during focusing, to an operating position in which the iris leaves define an opening of previously selected size.

In pending application Ser. No. 373,327, filed August 10, 1953 by Franz Werner and owned by the assignee of the present application, now Patent No. 2,803,182, there has been disclosed a preselector mechanism wherein a control lever, advantageously formed as an extension of one of the iris leaves of the diaphragm, is operatively coupled with a shift lever having a floating fulcrum; upon the displacement of an actuator, usually forming part of the shutter-release mechanism, the shift lever is moved without entrainment of the control lever until the fulcrum of the former is arrested in a position determined by the setting of a selector cam, further displacement of the actuator thereupon causing a change in the position of the control lever and, thereby, of the diaphragm to an extent corresponding to the cam setting.

In arrangements of the above and similar types, wherein the diaphragm-control member is carried together with the diaphragm itself on an axially movable lens barrel while the associated actuating mechanism is mounted on some stationary part of the camera housing or equivalent structure, difficulties arise in properly coupling the various elements together so as to maintain their operativeness in all positions of the objective system. These difficulties are particularly marked in the case of optical systems of large focal length, such as telephoto objectives, wherein the range of relative displacement of the parts may be quite substantial. It is, accordingly, an object of this invention to provide improved means for interconnecting a diaphragm-control member and an actuator mechanism therefor under circumstances as described above.

In accordance with a feature of the present invention, there is provided a diaphragm-control element whose pivot is positively coupled with the pivot of a rotatable transmission element through a link of adjustable length comprising a pair of telescoped members extending parallel to the direction of movement of a diaphragm support.

In accordance with another feature of the invention, the rotatable transmission element is a crank arm articulated onto one end of a shift lever with floating fulcrum and the associated selector cam is positioned near this crank arm, in the stationary part of the objective system, for engagement by a stop arm pivoted on the fulcrum of the shift lever whose opposite end is engageable by the actuator; as in the case of the above-identified pending application, the diaphragm-control element preferably comprises one of the iris leaves of the diaphragm.

Figure 2:
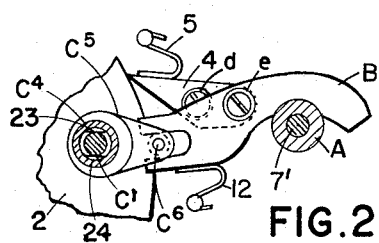

The invention will be described in greater detail with reference to the accompanying drawing in which:

Fig. 1 is an elevational view, partly in section, of an objective system incorporating a preselector mechanism according to the invention; and Fig. 2 is a fregmentary sectional view taken on the line II—II of Fig. 1.

In the drawing I have employed, where applicable, the same reference characters as have been used in the aforementioned Werner application to identify similar parts.

The objective shown in the drawing comprises an axially movable lens barrel 8 carrying the usual type of diaphragm with iris leaves 10 and grooved control ring 9. One of the iris leaves, designated C, has its pivot $C^1$ extended into an elongated shaft telescoped within a sleeve $C^4$ for positive rotary entrainment by the latter. Sleeve $C^4$ is rigid with a crank arm $C^5$ articulated at $C^6$ onto a shift lever B. This lever has a floating fulcrum $e$ around which there is swingable a stop arm 4 having a fixed pivot $d$ on the stationary part 14 of the objective housing which is provided with the usual bayonet coupling for attachment to a camera (not shown). Shaft $C^1$, rigid with iris leaf C, and sleeve $C^4$ are journaled in bearings 21 and 22 on lens barrel 8 and on housing part 14, respectively. The members $C^1$, $C^4$ are formed, over a part of their length, with respective external and internal projections 23, 24 whose flattened faces engage one another so as to positively interconnect these members for simultaneous rotation. The pivots of the several iris leaves, including shaft $C^1$, are lodged in a stationary mounting ring 25; rotation of control ring 9 relative to mounting ring 25 will swing all of the iris leaves in unison about their pivots, by virtue of the engagement of the grooves of ring 9 with studs 26 which rise from these leaves.

The free, curved end of shift lever B is engageable by a partly conical, partly cylindrical actuator A lodged in a side arm 14a of the objective housing. Actuator A is traversed by a stem $7^1$ which connects the shutter-trip button 7 with a knob 6, the latter being slidably guided on a fixed tube 20 so as to be manually depressible against the force of a spring 11. A shoulder $6^1$ of knob 6 bears upon a spring 19 which urges the actuator A downwardly when the knob is depressed.

A contoured disk or cam 2 is rotatable about the objective axis in the plane of stop arm 4 whose free end is urged against the periphery of this disk by a spring 5. Another spring 12 tends to rotate shift lever B about its fulcrum $e$ in a clockwise direction as viewed in Fig. 2, i.e. in opposition to the direction of rotation imparted to lever B by camming action when the actuator A descends. The setting of cam disk 2 is effected by a diaphragm-control ring 15 carrying a scale 15a. At 16 there has been shown the focusing ring of the objective and at 18 the threaded front ring thereof.

Normally, i.e. when the knob 6 is unoperated, spring 12 acts upon shift lever B to maintain crank arm $C^5$ in its limiting position illustrated in which leaf C holds the control ring 9 and, through it, the other iris leaves in a position of maximum diaphragm opening. When the knob 6 is depressed to trip the shutter (not shown) actuator A is entrained by it through the intermediary of spring 19 and rotates shift lever B counter-clockwise until the conical lower portion of the actuator has passed the extremity of this lever and the latter rests against the cylindrical upper portion thereof. With fulcrum $e$ immobilized in a position determined by the setting of disk 2 under the control of ring 15, lever B is swung around this fulcrum to an extent resulting in an angle of rotation of crank arm $C^5$ which places the diaphragm leaves 10 in a position corresponding to the one selected on scale 15a, the movement communicated to leaf C by the linkage $C^1$, $C^4$ being imparted to all the iris leaves through the common control ring 9. The subsequent release of knob 6 permits spring 11 to lift the assembly 6, 7, $7^1$, 19 and A to their original position whereupon spring 12 restores crank arm $C^5$ to its normal position of full diaphragm opening.

Axial displacement of lens barrel 8, under the control of focusing ring 16, will not interfere with the operation of the mechanism described, by virtue of the extensibility of the link constituted by the telescoped members $C^1$, $C^4$.

The invention is, of course, not limited to the specific embodiment described and illustrated but may be realized in various modifications and adaptations without departing from the spirit and scope of the appended claims.

I claim:

1. In a photographic camera, in combination, an objective housing, a lens barrel axially movable relatively to said housing, an iris diaphragm on said lens barrel, said diaphragm including an iris leaf provided with an elongated, axially extending pivot journaled on said lens barrel at a fixed location thereon within said housing, an elongated transmission member co-axial with said pivot at said fixed location and journaled in said housing, said member telescopically engaging said pivot with freedom of sliding motion in an axial direction relative thereto, said pivot and said member being provided with co-acting formations for mutual rotary entrainment, and actuator means engaging an extremity of said member remote from said iris leaf for imparting controlled rotation to said member and, thereby, to said iris leaf.

2. In a photographic camera, in combination, an objective housing, a lens barrel axially movable relatively to said housing, an iris diaphragm on said lens barrel, said diaphragm including an iris leaf provided with an elongated pivot rigidly joined to it and journaled on said lens barrel at a fixed location thereon within said housing, a sleeve slidably surrounding said pivot and positively coupled thereto for rotary entrainment, said sleeve and said pivot forming an extensible link traversing said housing at said fixed location in a direction parallel to the axis of said lens barrel, journal means on said housing for said sleeve, a crank arm rigid with said sleeve, a shift lever articulated onto said crank arm at a location outwardly spaced from said fixed location, said lever having a displaceable fulcrum, selector means for immobilizing said fulcrum in different positions, said selector means comprising a contoured disk rotatably mounted on said housing in concentric relationship with said lens barrel and an arm on said fulcrum engageable with said disk, spring means tending to maintain said shift lever in a position corresponding to wide-open position of said diaphragm, and actuator means for swinging said shift lever about said fulcrum in opposition to said spring means, thereby rotating said arm to an extent determined by the position of said fulcrum.

References Cited in the file of this patent

UNITED STATES PATENTS

| | | |
|---|---|---|
| 557,801 | Gual | Apr. 7, 1896 |
| 2,424,176 | Kals | July 15, 1947 |
| 2,612,091 | Weiss | Sept. 30, 1952 |

FOREIGN PATENTS

| | | |
|---|---|---|
| 1,080,386 | France | May 26, 1954 |
| (Corresponding U.S. Patent 2,803,182, Aug. 20, 1957) | | |
| 1,119,353 | France | Apr. 3, 1956 |